United States Patent
Davis

(10) Patent No.: US 6,755,383 B2
(45) Date of Patent: Jun. 29, 2004

(54) TIE-DOWN STRAP

(76) Inventor: Philip H. Davis, 13506 Little Cove Rd., Mercersburg, PA (US) 17236

(*) Notice: Subject to any disclaimer, the term of this patent is extended or adjusted under 35 U.S.C. 154(b) by 0 days.

(21) Appl. No.: 10/131,679

(22) Filed: Apr. 24, 2002

(65) Prior Publication Data

US 2003/0201377 A1 Oct. 30, 2003

(51) Int. Cl.$^7$ .................................... A47B 97/00
(52) U.S. Cl. ........................... 248/508; 248/354.7
(58) Field of Search ............... 248/500, 503, 248/505, 351, 354.7, 508; 24/300, 301, 68 CD, 482, 265 CD

(56) References Cited

U.S. PATENT DOCUMENTS

| | | | | |
|---|---|---|---|---|
| 1,555,322 A | * | 9/1925 | Kleinhesselink | 135/118 |
| 4,778,142 A | * | 10/1988 | Roba | 248/545 |
| 4,831,798 A | * | 5/1989 | Otteson | 52/153 |
| 5,402,557 A | * | 4/1995 | Dalen | 24/68 CD |
| 5,423,644 A | * | 6/1995 | First, Sr. | 410/100 |
| 5,440,790 A | * | 8/1995 | Chou | 24/302 |
| 5,608,951 A | * | 3/1997 | Chou | 24/302 |
| 5,988,194 A | * | 11/1999 | Collins | 135/118 |
| 6,032,916 A | * | 3/2000 | Holliday | 248/505 |
| 6,092,319 A | * | 7/2000 | Hicks | 40/603 |
| 6,371,346 B1 | * | 4/2002 | Sharma | 224/578 |
| 6,382,293 B1 | * | 5/2002 | Brockington et al. | 160/67 |

* cited by examiner

Primary Examiner—Leslie A. Braun
Assistant Examiner—A. Joseph Wujciak
(74) Attorney, Agent, or Firm—James Ray & Associates

(57) ABSTRACT

A tie-down apparatus comprises a cam buckle disposed intermediate each end of the tie-down apparatus, a first strapping material having a first end engageable with a first end of the cam buckle and a second strapping material having a first end engageable with a second end of the cam buckle. A hook like member is disposed on a second end of one of the first strapping material and the second strapping material and a ring like member is disposed on a second end of an opposite one of the first strapping material and the second strapping material. Further, the apparatus includes a means engageable with an end of the tie-down apparatus for anchoring the tie-down apparatus.

16 Claims, 6 Drawing Sheets

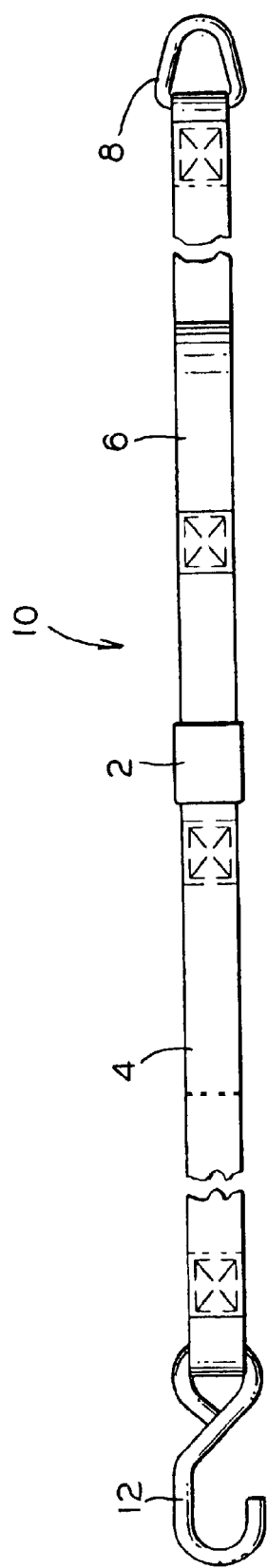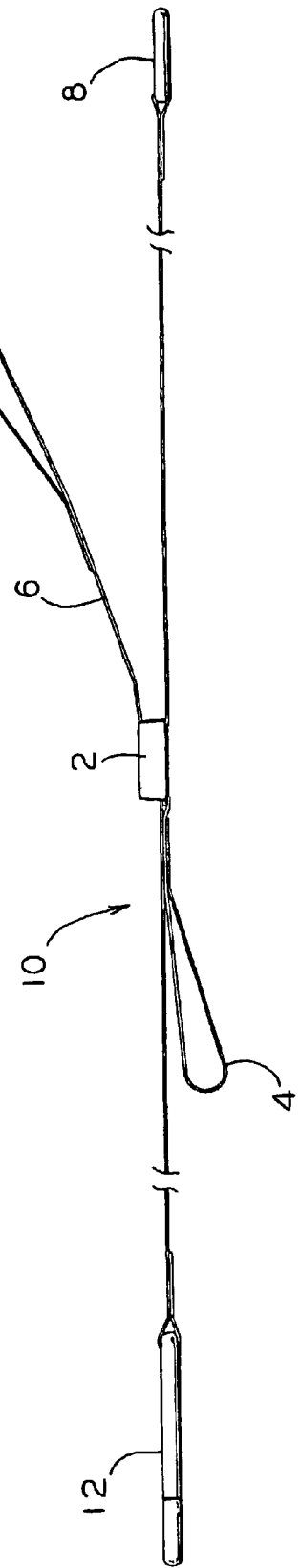

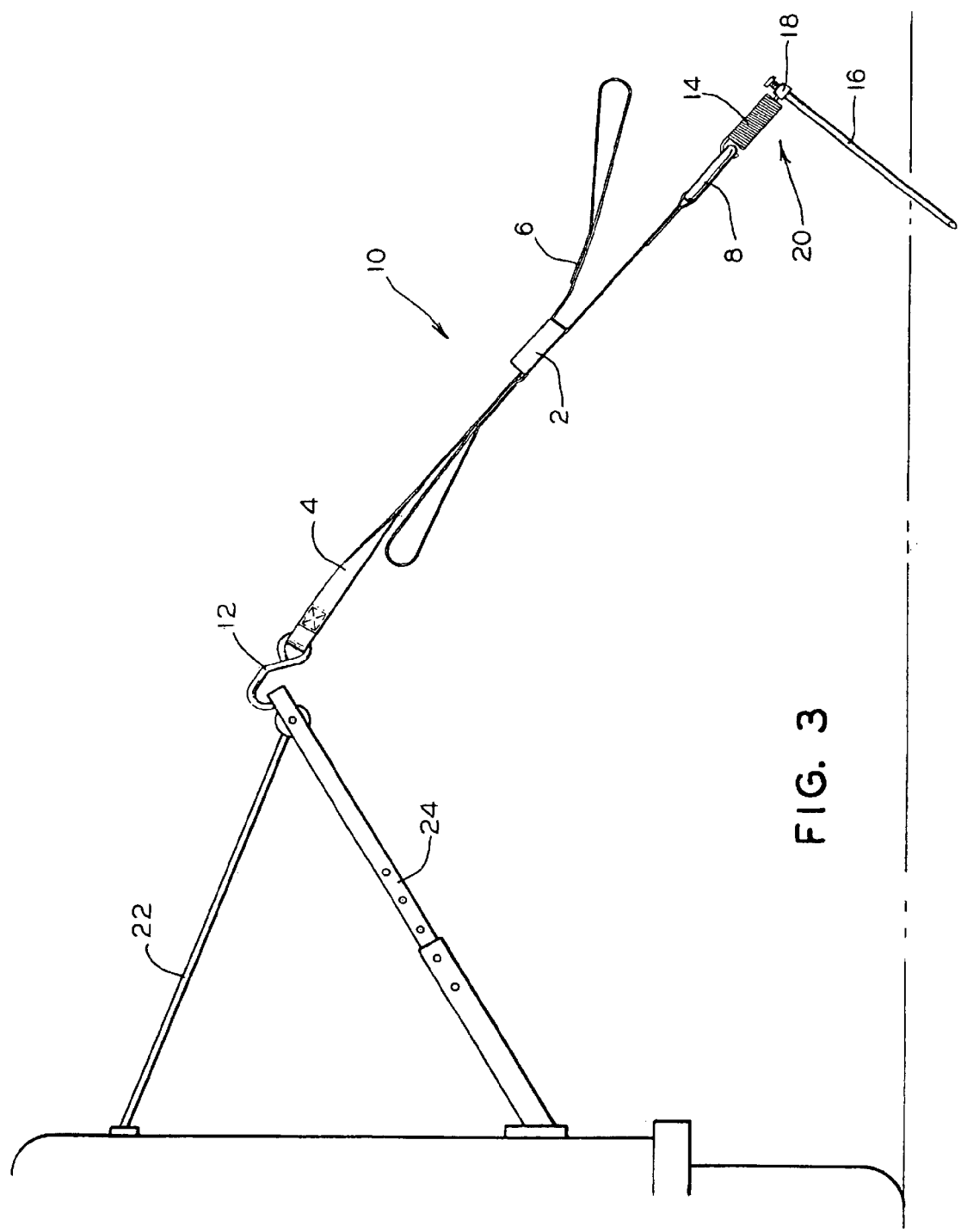

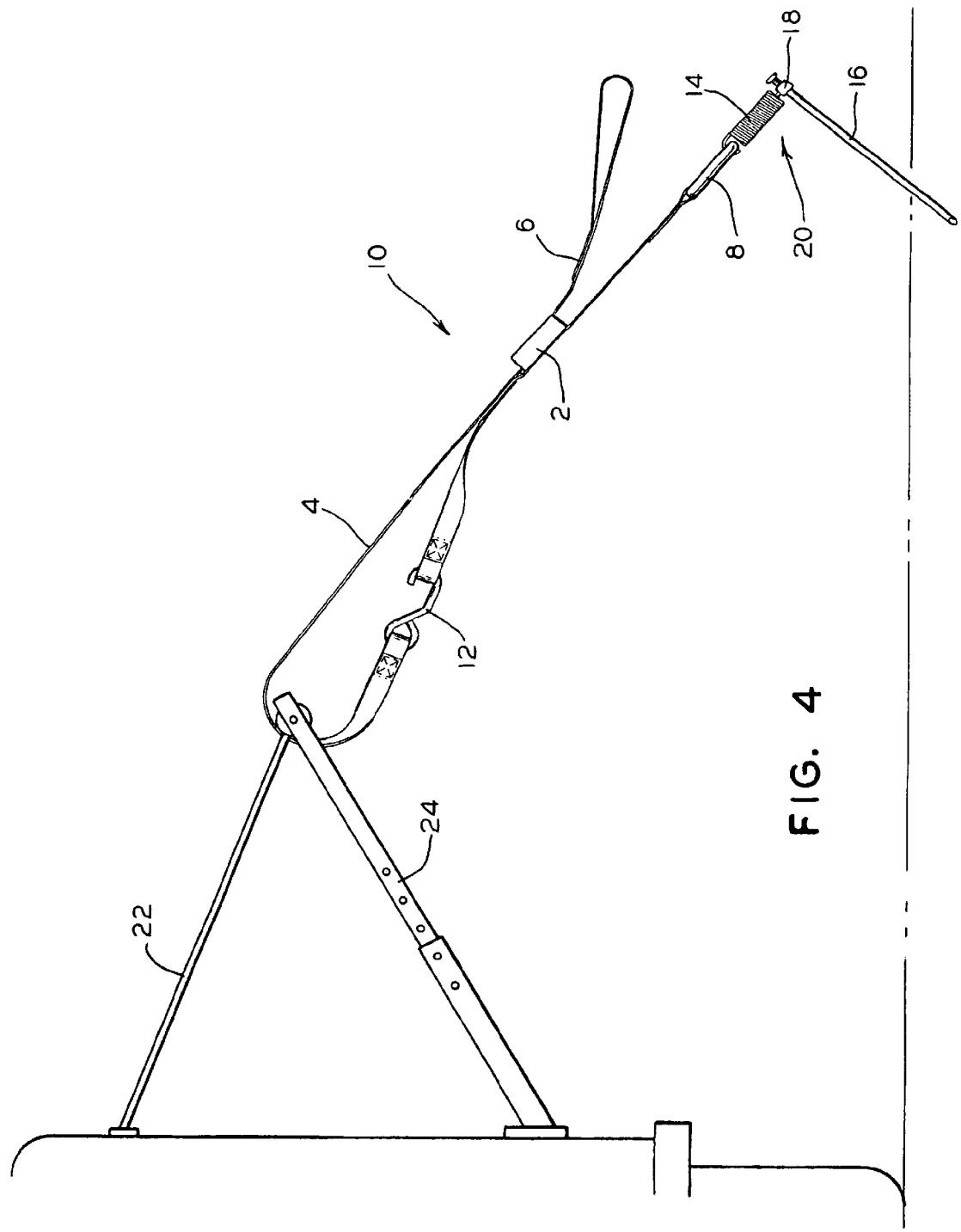

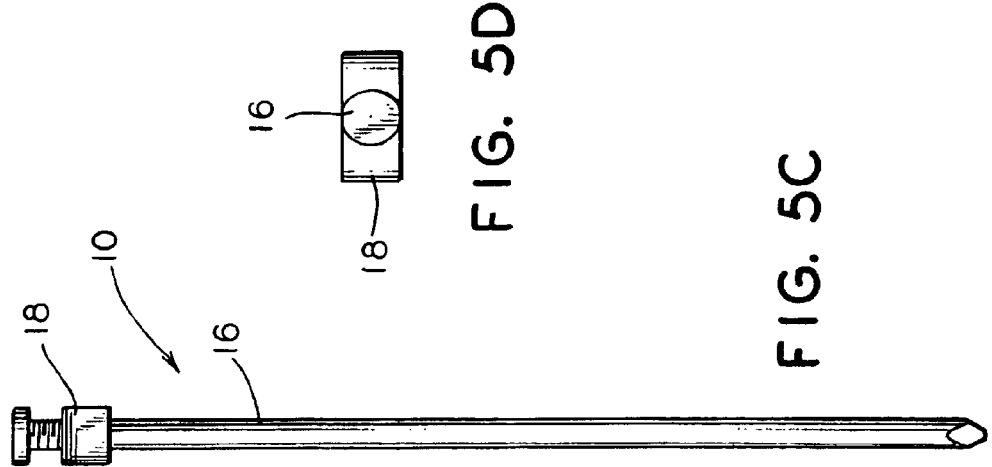
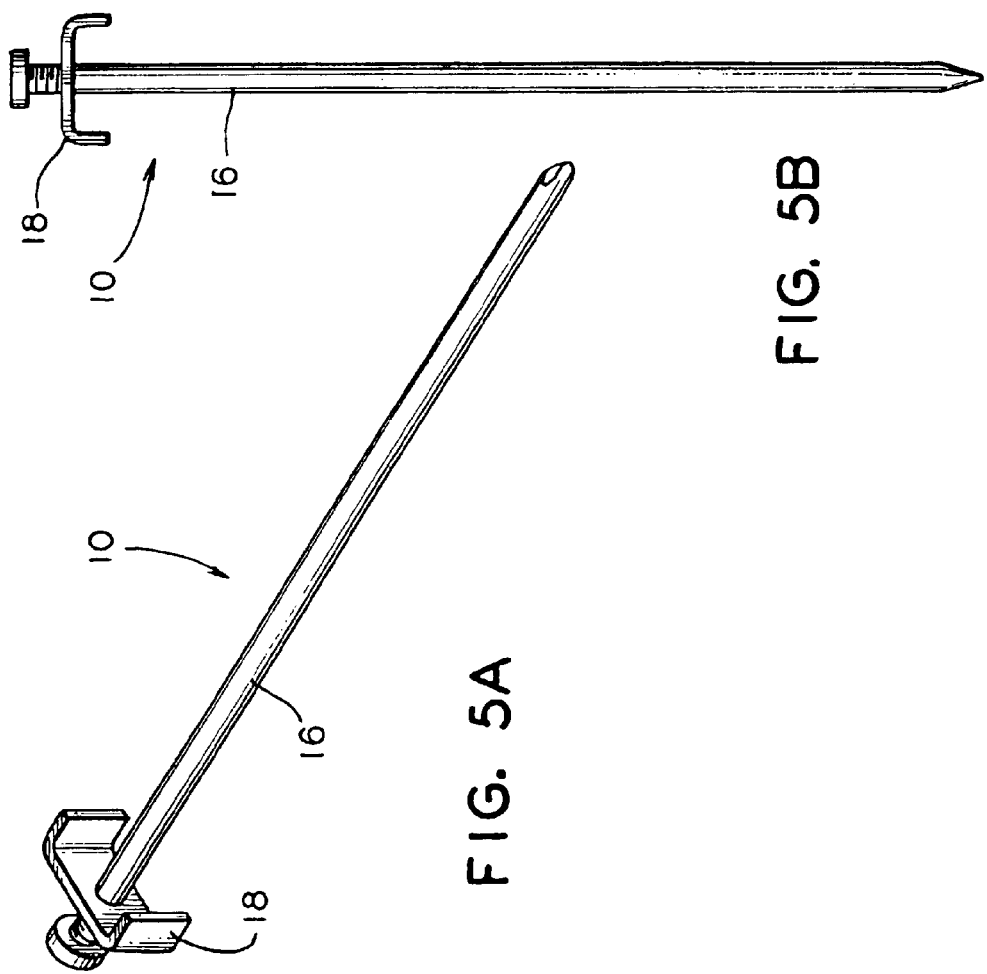
FIG. 5D
FIG. 5C
FIG. 5B
FIG. 5A

TIE-DOWN STRAP

FIELD OF THE INVENTION

The present invention relates, in general, to a tie-down strap that can be used to tie-down a variety of equipment, and more particularly, the present invention relates to a tie-down strap that can be used to positively secure an awning of mobile homes and RVs.

BACKGROUND OF THE INVENTION

Awnings of mobile homes or recreational vehicles are generally braced against the vehicle to prevent the awning from collapsing. A brace is usually available that is connected on one end to the vehicle and the other end to the awning. This supports the awning from falling.

However, the awning has no protection against any gusts of wind that may occur. There is nothing to prevent the awning from being blown away if a strong wind is encountered. The awning presents a large flat surface that can be subjected to an updraft of any strong wind and, although the brace may be strong, the brace does not prevent the awning from being lifted off if the wind is strong enough. Therefore, there is a need for a means of securing the awning when windy conditions occur.

SUMMARY OF THE INVENTION

The present invention provides a tie-down apparatus. The tie-down apparatus comprises a cam buckle disposed intermediate each end of the tie-down apparatus, a first strapping material having a first end engageable with a first end of the cam buckle and a second strapping material having a first end engageable with a second end of the cam buckle.

A hook like member is disposed on a second end of one of the first strapping material and the second strapping material and a ring like member is disposed on a second end of an opposite one of the first strapping material and the second strapping material. Further, the apparatus includes a means engageable with an end of the tie-down apparatus for anchoring the tie-down apparatus.

An alternate embodiment of the invention provides in combination with an awning the improvement comprising a tie-down apparatus. The tie-down apparatus includes a cam buckle disposed intermediate each end of the tie-down apparatus, a first strapping material having a first end engageable with a first end of the cam buckle and a second strapping material having a first end engageable with a second end of the cam buckle.

There is a hook like member disposed on a second end of one of the first strapping material and the second strapping material and a ring like member disposed on a second end of an opposite one of the first strapping material and the second strapping material. Further, there is a means engageable with an end of the tie-down apparatus for anchoring the tie-down apparatus.

OBJECTS OF THE INVENTION

The primary object of the present invention is to provide a tie-down apparatus that can be used to secure an awning of a mobile home or a recreational vehicle.

It is also an object of the present invention to provide a tie-down apparatus that is easy to install.

Another object of the present invention to provide a tie-down apparatus that is sufficiently flexible in it's arrangement so as to able to be used with a variety of awning members.

It is still another object of the present invention to provide a tie-down apparatus that can be used for other applications.

These and various other objects and advantages of this invention will become apparent after a full reading of the following detailed description, particularly, when read in conjunction with the attached drawings as described below and the appended claims.

BRIEF DESCRIPTION OF THE DRAWINGS

FIG. 1 is a top view of the tie-down apparatus according to the present invention.

FIG. 2 is a side view of the tie-down apparatus according to the present invention.

FIG. 3 is a side view of the tie-down apparatus of the present invention as it would be used in conjunction with an awning of a mobile home/recreational vehicle according to one embodiment of the invention.

FIG. 4 is a side view of the tie-down apparatus of the present invention as it would be used in conjunction with an awning of a mobile home/recreational vehicle according to an alternate embodiment of the invention.

FIGS. 5a, 5b, 5c and 5d show various views of such means for anchoring the tie-down apparatus.

Figure 6A:
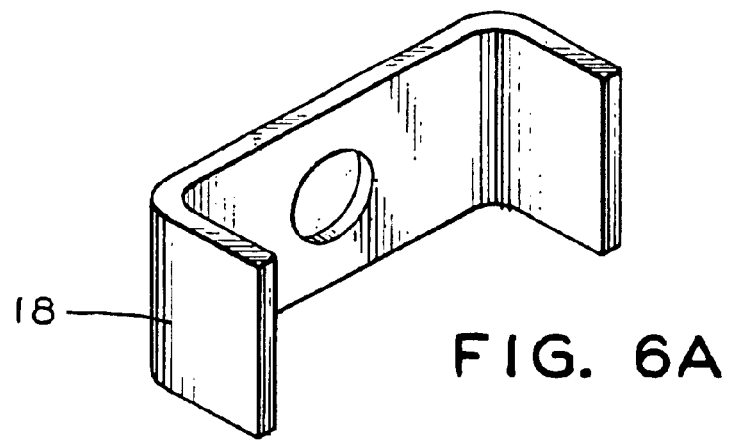
FIGS. 6a, 6b, 6c and 6d show various views of the bracket portion of the means shown in FIG. 5.
Figure 6B:
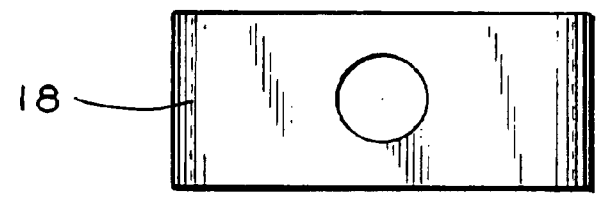
Figure 6C:
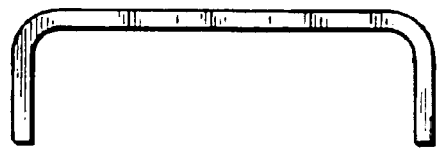
Figure 6D:
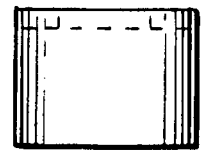
Figure 7A:
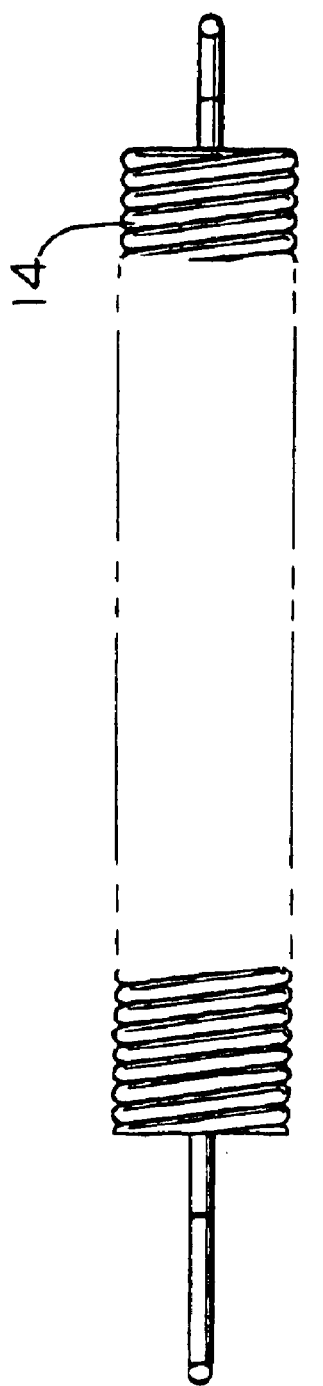
FIGS. 7a and 7b show a top and side view of the means for providing tension to such tie-down apparatus.
Figure 7B:
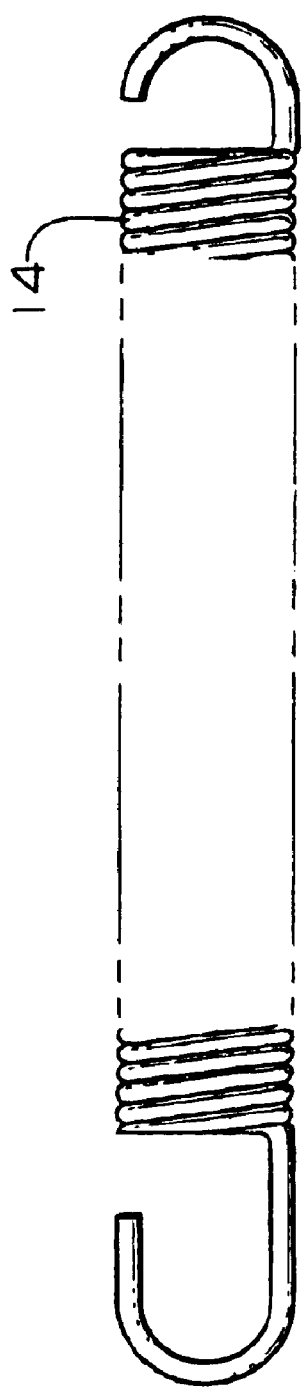

BRIEF DESCRIPTION OF THE PRESENTLY PREFERRED AND ALTERNATE EMBODIMENTS OF THE INVENTION

Prior to proceeding with the more detailed description of the present invention it should be noted that, for the sake of clarity, identical components which have identical functions have been designated by identical reference numerals throughout the several views illustrated in the drawings. Although the description refers to the use of the present invention in conjunction with it's use with an awning of a mobile home or a recreational vehicle, the use of the present invention is not limited to such and is applicable to a variety of applications.

Reference is now made to FIGS. 1 and 2. Illustrated therein is a tie-down apparatus, generally designated 10, in a presently preferred embodiment of the present invention. Such tie-down apparatus 10 comprises a cam buckle 2 disposed intermediate each end of the tie-down apparatus 10. Although it is not necessary it is generally preferred that such cam buckle 2 be disposed near the center of the tie-down apparatus 10.

There is a first strapping material 4 having a first end engageable with a first end of the cam buckle 2 and a second strapping material 6 having a first end engageable with a second end of the cam buckle 2. As is evident in FIG. 1 the first end of both first strapping material 4 and the second strapping material 6 is pulled through the cam buckle 2 and is either tightened or loosened depending upon the length needed. Again as is evident from FIG. 1 there is a loop formed on the end of the first end of both first strapping material 4 and second strapping material 6.

There is a hook like member 12 disposed on a second end of the first strapping material 4 for engagement with whatever is to be tied down. There is also a ring like member 8 disposed on a second end of second strapping material 6 for securing the second end of the tie-down apparatus 10. In a presently preferred embodiment of the invention such ring like member 8 has a generally triangular shape or a D-shape.

The tie-down apparatus 10 has a means, generally designated 20, for anchoring the tie-down apparatus 10. In one embodiment of the invention such means 20 is engageable with the ring like member 8. In the case where the tie-down apparatus 10 is being secured to the ground such means 20 that is engageable with ring like member 8 includes a stake 16 and a bracket 18. The bracket 18 is engageable with an upper surface of the ring like member 8 and folds over the ring like member 8. The bracket 18 has a generally inverted U-shape so that as it folds over the ring like member 8, such ring member 8 is secured and cannot slip off the stake 16.

There is further a means 14 disposed on the tie-down apparatus 10 for providing a predetermined amount of tension on the tie-down apparatus 10. Such means 14 is disposed anywhere on the tie-down apparatus 10. As is seen in FIG. 3 such means 14 is disposed on such ring like member 8 and is secured to the ground by such anchoring means 20. However, such means 14 can be disposed on the second end of the first strapping material 4 or as is seen in FIG. 3 on the second end of the second strapping material or it can be disposed intermediate the second end of first strapping material 4 and the second end of second strapping material 6. It is presently preferred that such means 14 for providing a predetermined amount of tension on the tie-down apparatus 10 is a spring. As is evident in FIG. 3 when such spring 14 is engageable with the ring like member 8 the anchoring means 20 may secure one end of the spring 14 to the ground. Just as the bracket 18 folded over the ring member 8 such bracket 18 folds over the end of such spring 14 so as to secure it.

An alternate embodiment of the invention as is evident if FIGS. 3 and 4 provides a tie-down apparatus 10 in combination with an awning 22 of a mobile home or recreational vehicle that is supported by a brace 24. This embodiment provides a similar tie-down apparatus 10 to that described previously. The hook 12 of such tie-down apparatus 10 can connect directly to the awning 22 or brace 24 if the awning 22 or brace 24 is adapted to permit the hook 12 to engage with it as is seen in FIG. 3. If there is no place for the hook 12 to engage the awning 22 or brace 24, the hook 12 can loop around the awning 22 and connect to a loop end of such first strapping material as is seen in FIG. 4.

While both the presently preferred and a number of alternative embodiments of the present invention have been described in detail above it should be understood that various other adaptations and modifications of the present invention can be envisioned by those persons who are skilled in the relevant art without departing from either the spirit of the invention or the scope of the appended claims.

I claim:

1. A tie-down apparatus, said tie-down apparatus comprising:
   (a) a cam buckle disposed intermediate each end of said tie-down apparatus;
   (b) a first strapping material having a first end engageable with a first end of said cam buckle;
   (c) a second strapping material having a first end engageable with a second end of said cam buckle;
   (c) a hook member disposed on a second end of one of said first strapping material and said second strapping material;
   (d) a ring member disposed on a second end of an opposite one of said first strapping material and said second strapping material; and
   (e) a means engageable with an end of said tie-down apparatus for anchoring said tie-down apparatus; said means for anchoring said tie-down apparatus includes a stake and a bracket.

2. The tie-down apparatus, according to claim 1, wherein said tie-down apparatus further includes a means for providing a predetermined amount of tension on said apparatus.

3. The tie-down apparatus, according to claim 2, wherein said means for providing a predetermined amount of tension on said apparatus is a spring.

4. The tie-down apparatus, according to claim 2, wherein said means for providing a predetermined amount of tension on said tie-down apparatus is disposed on at least one of said ring member, said hook member, and intermediate said each end of said tie-down apparatus.

5. The tie-down apparatus, according to claim 1, wherein said ring member has one of a generally triangular shape and a D-shape.

6. The tie-down apparatus, according to claim 1, wherein said bracket is engageable with an upper surface of one of said ring member and said spring.

7. The tie-down apparatus, according to claim 1, wherein said bracket is engageable with said means for providing a predetermined tension on said tie-down apparatus.

8. The tie-down apparatus, according to claim 1, wherein said bracket is generally an inverted U-shaped.

9. In combination with an awning the improvement comprising a tie-down apparatus, said tie-down apparatus including:
   (a) a cam buckle disposed intermediate each end of said tie-down apparatus;
   (b) a first strapping material having a first end engageable with a first end of said cam buckle;
   (c) a second strapping material having a first end engageable with a second end of said cam buckle;
   (c) a hook member disposed on a second end of one of said first strapping material and said second strapping material;
   (d) a ring member disposed on a second end of an opposite one of said first strapping material and said second strapping material; and
   (e) a means engageable with an end of said tie-down apparatus for anchoring said tie-down apparatus, said means for anchoring said tie-down apparatus includes a stake and a bracket.

10. The combination, according to claim 9, wherein said tie-down apparatus further includes a means for providing a predetermined amount of tension on said apparatus.

11. The combination, according to claim 10, wherein said means for providing a predetermined amount of tension on said apparatus is a spring.

12. The combination, according to claim 9, wherein said means for providing a predetermined amount of tension on said tie-down apparatus is disposed on at least one of said ring member, said hook member, and intermediate said each end of said tie-down apparatus.

13. The combination, according to claim 9, wherein said ring member has one of a generally triangular shape and a D-shape.

14. The combination, according to claim 9, wherein said bracket is engageable with an upper surface of one of said ring member and said spring.

15. The combination, according to claim 9, wherein said bracket is engageable with said means for providing a predetermined tension on said tie-down apparatus.

16. The combination, according to claim 9, wherein said bracket is generally an inverted U-shaped.

* * * * *